Patented Nov. 17, 1942

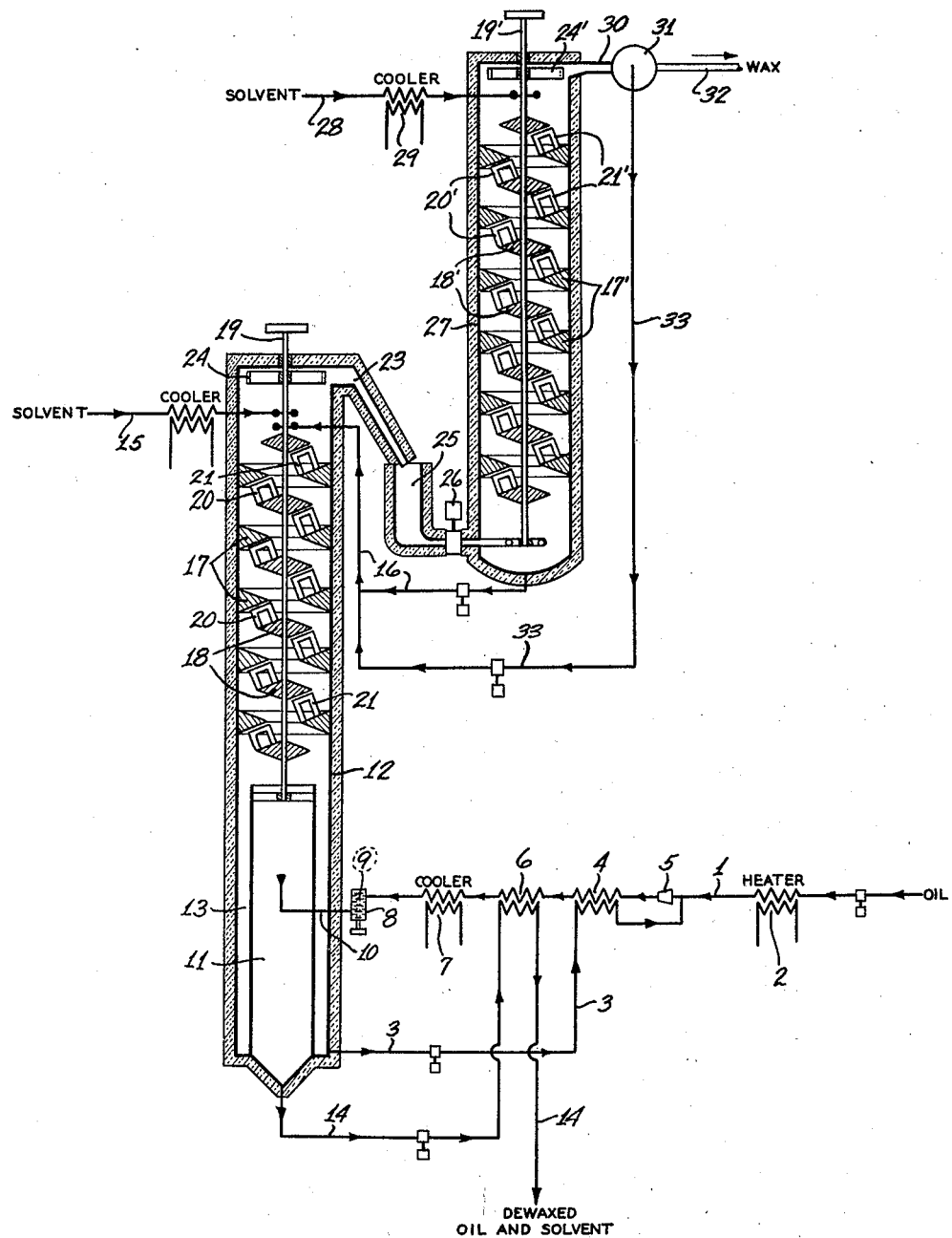

2,302,427

UNITED STATES PATENT OFFICE 2,302,427

PROCESS OF SEPARATING WAX-CONTAINING MATERIALS

Eddie M. Dons and Oswald G. Mauro, Tulsa, Okla., assignors to Mid-Continent Petroleum Corporation, Tulsa, Okla., a corporation of Delaware Application March 27, 1940, Serial No. 326,158

8 Claims. (Cl. 196—18)

This invention relates to processes of separating wax-containing materials. The invention may be employed in separating wax and oil found in various kinds of materials including mineral oils, petrolatum, slack wax and vegetable waxes. It can be conveniently used in dewaxing petroleum lubricating oils to produce low pour point lubricants, or in obtaining high melting point waxes from petrolatum, and in purifying slack wax, as well as in the treatment of other products to separate waxy materials.

Prior to our inventions in this art, the well recognized commercial systems for separating wax involved the operations of cold settling, centrifuging or filtering to separate the wax from oil. In modern refinery practice the previous methods regarded as most efficient include the step of chilling a solution of oil and solvent to precipitate the wax, and thereafter passing the solution through a filter to separate the precipitated wax.

Another phase of the old wax-separating processes appears in the high cost of dewaxing equipment wherein a large filtering plant is relied upon to separate the mass of precipitated wax from the diluted oil. The usual filters are quite expensive and special care and attention is required in the operation of the filtering plant. This is true when normally liquid solvents are employed, and the cost is, of course, materially increased in a plant designed for normally gaseous solvents. Aside from the expense involved in such plants, the popular solvents usually regarded as most desirable in the chilling and filtering apparatus, are inflammable and explosive materials requiring special precautions, and always a source of danger.

Furthermore, the filtering operations do not remove all of the oil from the wax. The large mass of precipitated wax is usually deposited on the filter in the form of clusters of interlocked wax crystals with oil-retaining cavities inside of the clusters, and additional bodies of diluted oil are trapped between the clusters on the filter. A substantial percentage of the oil is thus retained in the mass of wax.

Therefore, an object of the present invention is to generally improve this art by producing a commercially feasible dewaxing process having advantages not found in the modern dewaxing systems. An object is to avoid the expense and trouble heretofore involved in the use of extremely large filters to separate the body of diluted oil from the wax, at the same time providing a less expensive system wherein the oil is more effectively removed from the wax particles.

Another object is to provide a single dewaxing system adapted to very efficiently separate various different types of wax-containing materials, including viscous residues and comparatively light distillates, thereby overcoming a serious objection to the usual commercial systems which lack the desired flexibility and fail to provide a normal efficiency or economy in dewaxing the different products.

We can also avoid the troublesome operating conditions, such as requirements for a critical rate of chilling, or very gradual chilling, involved in the use of some of the modern solvents. The economy of very rapid chilling and practically instantaneous precipitation of wax can be obtained in the new process.

More specifically stated, an object is to obtain all of these advantages in a very simple continuous system wherein the wax is most effectively separated and thoroughly cleansed while it is in transit from the precipitating station to a recovery station.

With the foregoing and other objects in view, the invention comprises the novel process hereinafter more specifically described and shown in the accompanying drawing, which illustrates one form of the invention. However, it is to be understood that the invention comprehends changes, variations and modifications within the scope of the claims hereunto appended.

Briefly stated, the preferred form of the invention includes the steps for precipitating the wax in a solution, extracting the main body of solution from the wax, and thereafter subjecting the wax to a cleansing operation wherein the traces or films of solution are forcibly removed from the wax.

At an initial stage, the wax-bearing material may be dissolved in a solvent and then cooled to precipitate wax particles in the solution. The density of the cooled solution is preferably greater than the density of the wax particles. The viscosity of the cooled solution, and the interfacial tension existing between said wax particles and the solution, are preferably low enough to allow the wax to freely rise in the solution.

At a subsequent stage, there is a preliminary separation due to the differences in specific gravity, the relatively dense solution moving downwardly while the wax particles rise in the solution, carrying with them relatively small portions of the solution. At this stage, the rising wax particles may be surrounded by films of the oil solution, and additional portions of the solution will be distributed throughout the mass of wax particles.

This condition is preferably followed by a cleansing operation which separates oily solution from the wax particles to produce a mass of clean wax, free of the oil, etc. For example, a descending stream of oil-solvent may be transmitted through the rising mass of wax particles, so as to forcibly scrub each wax particle, thereby dissolving the oily films and removing them from the wax particles, at the same time dissolving the relatively free portions of oil or solution carried by the mass of wax. The rising wax particles are thus subjected to a most effective cleansing action, and thereafter discharged from the descending solvent. As a consequence, the wax can be obtained in a remarkably clean and pure condition, far superior to the condition of the wax obtained in the modern filtering apparatus.

In comparing this process with the usual filtering systems wherein a solvent is sprayed onto the wax deposited on the surface of the filter, it will be observed that the so-called "wax cake" on the filter is in the form of a compact body with oil particles trapped throughout the mass of wax, and that the spray of solvent can not effectively remove such oil. This is quite different from the cleansing action which occurs when a stream of free wax particles rises through a descending stream of oil-solvent, which flows through the spaces between the wax particles, so as to very readily dissolve the relatively free liquid between the wax particles, and exert a forcible scrubbing and dissolving action on the oily films adhering to these wax particles.

Furthermore, instead of subjecting the oil and wax to numerous different kinds of treatments in a series of different types of apparatus, we can accomplish all of the improved results in a simple unitary system wherein the wax is precipitated in a continuous stream of solution, and thereafter separated by gravity to provide a stream of wax particles which flow through the cleansing solution.

We can eliminate the special precautions ordinarily involved in filtration, and the wax can be quickly precipitated in either a liquid or solid condition and in fine or coarse particles, or any kind of cluster formation. In commercial practice this absence of special requirements is an important advantage, as it overcomes the trouble and expense of deliberately arranging for the critical operating conditions which produce readily filterable wax.

It is not necessary for us to break up the wax clusters, but this is a convenient means for releasing the oil solution trapped therein, and the resultant slurry may be readily discharged into a settling zone where the minute wax particles rise from the relatively dense solution, and pass through the cleansing zone where each minute wax particle is exposed to the forcible cleansing action of the descending solvent stream. In this manner we can positively remove and recover a substantial percentage of oil which ordinarily remains as an impurity in the wax.

It is to be understood that such unusual efficiency in removing and purifying the wax also increases the yield of dewaxed oil, and in many cases the main object is to remove and recover the optimum percentage of dewaxed oil, without resorting to expensive refining operations.

The wax may be precipitated in any desired manner and at any suitable temperature, a low temperature being required in dewaxing lubricating oils to produce low pour point lubricants, while much higher temperatures are usually desired for the precipitation of high melting point wax in petrolatum, or in the separation of high melting point wax from low melting point wax which may or may not contain a substantial percentage of oil. As previously indicated, the precipitated wax particles may be in any desired liquid or solid condition, either fine or coarse, or in the form of clusters, and the gravity separation of the wax and solution may be due to a relatively high density of the solution, or to a relatively high density of the wax particles. Advantages are gained in a true counterflow wherein a rising stream of wax particles contacts directly with a continuous descending stream of cleansing solvent, but this condition may be reversed, and various types of batch systems could be employed to obtain some of the advantages of the invention.

However, the preferred form of the invention includes the step of precipitating wax in a solution, followed by gravity separation of wax from the major portion of the solution, and then cleansing the wax particles by means of solvent which dissolves and removes undesirable portions of solution carried by the wax particles. The cleansing operation may be carried out to any desired extent, depending upon economic conditions or the nature of the products sought in the process. In some cases, more or less of the oil may be deliberately retained in the wax, thereby reducing the time factor in the cleansing zone where the oil solution is forcibly removed from the wax particles.

To most effectively establish and maintain the new combination of conditions, the nature of the solvent requires consideration, not with the idea of producing filterable wax, but to provide for the comparatively rapid movements of the wax particles, and other conditions involved in the new process. The density or specific gravity of the solvent is an important consideration in the step of causing the rapid gravity separation of the wax from the solution, and also in the subsequent step of passing the stream of wax particles through a counterflowing stream of cleansing solution. The viscosity of the solution and cleansing solvent even at very low temperatures, is another factor that should not prevent the desired free and rapid movements of the wax particles. Another property of the solvent relates to the interfacial tension existing between the wax particles and the oil solution, or between said wax particles and the cleansing solvent. This interfacial tension is a subject separate and distinct from the viscosity, and it should not be high enough to interfere with said free and rapid movements of the wax particles, even when the process is carried out at very low temperatures, such as 0° F., or lower. However, we will show that the invention is not limited to a particular solvent, as the various properties can be obtained from numerous different solvents.

Assuming that the object is to dewax a lubricating oil stock to produce a low cold test oil, and that the wax particles are to freely rise in a solution of the oil and solvent, the following properties are preferably present in the solvent, or solvent blend, at the optimum operating temperature:
(1) An excellent oil solvent.
(2) Low solvent power for wax.
(3) A low viscosity when containing a high percentage of oil in solution.
(4) The interfacial tension existing between the wax particles and the solvent-oil mixture is less, as expressed in dynes per centimeter, than the work of flotation of the rising wax particles, as also expressed in dynes per centimeter.
(5) The density of the solvent-oil mixture is high enough to provide the necessary energy differential between the interfacial tension and the buoyancy.

A single solvent having all of these properties may be employed, or the several different conditions may be obtained by using a plurality of solvents each having one or more, but not all of the desired properties.

Continuing this illustration, and assuming that one desires to obtain the additional advantage of avoiding the hazards as to fire and explosion involved in using the solvents that have become most popular in the modern filtering processes, any of the following solvent blends may be employed in the new process:

50% carbon tetrachloride and 50% acetone.
50% perchlorethylene, 40% isopropyl acetate and 10% dichlorethyl ether.

Other illustrations include methylene dichloride with acetone, or with isopropyl acetate and dichlorethyl ether. Tetrachlorethane with acetone. Trichlorethane with acetone and furfural. Ethylene dichloride with ethyl acetate and dichlorethyl ether. For convenience in commercial practice, methylene dichloride and dichlorethyl ether (Chlorex) provide a desirable combination of only two solvents. However the present invention is not limited to any particular solvent.

The apparatus herein shown is disclosed and claimed in an application for patent filed by us on March 27, 1940, Serial Number 326,159.

The accompanying drawing is a diagrammatical view of a system which may be employed to carry out one form of the invention.

A continuous stream of the wax-bearing charging stock, for example, a lubricating oil stock, enters the system through a pipe 1 which may be provided with a heater 2. A continuous stream of dewaxing solvent, from a source to be hereafter described, is conducted through a pipe 3 and heat exchanger 4 to the oil supply pipe 1. The continuous streams of heated oil and solvent are united in the pipe 1 and transmitted through a mixing nozzle 4 where the oil and solvent are mixed at a temperature high enough to form the desired solution.

The continuous stream of solution is transmitted through a heat exchanger 5 for additional cooling. Thereafter, the stream of solution passes through a cooler, or chiller, 7 where the flowing solution is cooled to a temperature desired for precipitation of wax therein.

If desired, the resultant mixture of solution and precipitated wax may be transmitted into comminuting device 8 including a rotary breaker 9 whereby the wax is forcibly divided into minute particles suspended in the chilled solution to form an approximately homogeneous slurry of wax and said solution. A pipe 10 conducts a continuous stream of the wax particles and solution into a settling compartment 11 surrounded by the lower portion of a separating chamber 12. This chamber 12 may be in the form of an upright column covered with insulation. Its lower portion may be separated from and concentric with the inner settling compartment 11, so as to form an annular settling compartment 13 around said inner compartment. In this form of the invention, the settling compartments 11 and 13 provide a pair of settling zones immediately below and in free communication with a cleansing zone hereafter described.

The incoming stream of chilled solution and wax particles may be delivered from the pipe 10 to the settling compartment 11 at approximately the temperature selected for precipitation of wax in the cooler, or chiller, 7. For example, this temperature may be about 0° F., and we prefer to insulate the chamber 12 so as to maintain the desired extracting and cleansing temperatures therein, as this avoids the necessity of providing a cooling jacket around the chamber. In fact, an advantage is gained by avoiding excessive cooling of the walls of said chamber, as such cooling would tend to produce an adhesive condition in the wax at said walls, thereby interfering with the desired free movements of the wax.

We are assuming that a relatively dense solvent has been selected for this operation, and that the viscosity and interfacial tension are low enough to allow the wax particles to freely rise in the dense solution. In this event, the major portion of the dense solution will freely move downwardly to the bottom of the settling compartment 11 where it is discharged through a pipe 14. This outgoing solution is free of wax and it may be distilled in any suitable manner to remove the solvent from the dewaxed oil. However, before leaving the dewaxing system, it can be conveniently transmitted through the heat exchanger 6 to aid in cooling the incoming solution. It will be observed that most of the oil is very easily, quickly and economically dewaxed in the simple settling compartment 11, and immediately discharged from the dewaxing system.

Attention is now directed to the separating zone, or extracting zone established near the point where the incoming mixture of solvent and wax enters the settling compartment 11. The mass of wax particles move upwardly and carry with them portions of the solution, including oily films around the wax particles and relatively free portions of the solution between the rising wax particles. However, this rising mass moves through the open top of the settling compartment 11 and passes through a relatively heavy descending stream which may be produced by continuously introducing streams of cleansing solvent through pipes 15 and 16 leading into the upper portion of the column 12. It will be understood that the cleansing solvent has the previously mentioned requirements as to density, viscosity and interfacial tension, and that it will readily dissolve the oil without dissolving the wax.

Therefore, the stream of cleansing solvent will freely descend in direct contact with the rising stream of wax particles, so as to dissolve the free portions of oil solution carried by the wax, and also forcibly scrub the oily films from the rising wax particles. A free counterflow of this kind does not produce a violent artificial disturbance that would impair the natural cleansing flow due to different specific gravities of the counterflowing streams. However the cleansing action may be aided by any suitable mechanical appliances. For example, the upper portion of the column 12 may be provided with alternating baffles including a series of rings 17 extending inwardly from the inner face of the column 12 and a series of central baffle members 18 arranged as shown in the drawing to produce an elongated tortuous passageway wherein the rising wax particles move back and forth in a zigzag course. The stream of cleansing solvent descends through the rising stream of wax particles, and the counterflowing streams are divided into numerous layers of different specific gravities contacting with each other and advancing in intersecting paths as they flow from one baffle to another. These baffles are preferably provided with upwardly inclined top and bottom faces to permit free movement of the rising wax particles. It will be observed that the rising layers of wax particles move upwardly while in contact with the upwardly inclined faces, and that said wax particles intersect the descending solvent while rising from one upwardly inclined plane to another.

This feature tends to prevent the wax particles from clinging to the baffles. However, any suitable mechanical means may be employed to prevent or limit the growing of wax crystals which might otherwise extend from the bottom faces of the baffles. For example, the central baffles 18 may be fixed to a rotary shaft 19, so as to rotate with the shaft, and scrapers 20 may extend from the top faces of these rotary baffles to remove waxy material from the bottoms of the stationary baffle rings 17. These stationary baffles may be likewise provided with scrapers 21 extending from their top faces to remove waxy material from the bottom faces of the rotating baffles. In each case, the scrapers extend from the top of one baffle to a point adjacent to the bottom of the next higher baffle. It is not necessary to forcibly scrape the baffles, the object being to limit the thickness of any wax deposit tending to grow on the baffles.

An interesting feature appears in the effective cleansing of the rising wax particles due to the forcible scrubbing and dissolving action of the descending solvent which repeatedly crosses the path of the wax in the cleansing zone. Attention is also directed to the unique condition at the lower portion of this cleansing zone where the descending solvent is diverted from the top of the settling compartment 11. This deflection of the descending solvent is due partly to the upward force of the rising stream of wax particles issuing from the top of said compartment 11, and partly to the descending current in the outer settling compartment 13. The lowermost central baffle 18 also tends to deflect the descending solvent toward the outer compartment 13. Some of the wax particles may be swept into the settling compartment 13, but these wax particles are so light that they will eventually rise in the heavy solvent and return to the mass of wax, instead of passing to the bottom of said settling compartment 13.

The heavy cleansing solvent performs an important function in removing oil carried by the wax particles. However, most of the oil is removed from the wax in said initial settling chamber 11, so the cleansing solvent stream which descends through the settling chamber 13 contains only a small percentage of oil. Therefore, this reasonably fresh body of solvent can be very conveniently used in a preceding stage of the process. For example, it may be continuously transmitted from the bottom of the settling chamber 13 through the pipe 3 to the heat exchanger 4, and thence to the continuous incoming stream of wax-bearing oil in the pipe 1.

At this point it may be observed that a substantial advantage is gained at an initial stage in the settling compartment 11, where a free counterflow of wax and oil solution immediately removes most of the oil from the wax. This desirable quiescent settling in the compartment 11 is not disturbed by the oil solvent descending from the higher scrubbing zone. Since the descending solvent is diverted into the other settling compartment 13 it does not mix with the outgoing dewaxed solution in the pipe 14, and it permits free return of wax particles that may be carried into said settling compartment 13.

The velocity and time of the cleansing action may be regulated to separate all of the oil carried by the wax, or any desired percentage of oil may be discharged with the wax, depending upon the commercial requirements. The scrubbed wax particles are discharged in the form of a slurry through a pipe 23 leading from the top of the chamber 12 where rotary blades 24 on the shaft 19 tend to centrifugally impel the slurry toward the outlet. This outgoing material can be immediately conducted to storage. However, in the specific example illustrated in the drawing, the pipe 23 discharges into an open tank 25 to provide a bulk supply for a pump 26 which forces a continuous stream of the slurry into the lower portion of a supplemental cleansing chamber. This chamber is in the form of a column 27 covered with insulation and having an inlet near the top for a stream of solvent which enters through a pipe 28. This solvent conforms to the requirements heretofore pointed out, and it may be cooled to the operating temperature by passing through a cooler or chiller 29.

The column 27 may be equipped with baffles 17' and 18', scrapers 20' and 21', and discharge blades 24' on a shaft 19', having the functions of corresponding elements previously described in referring to the column 12.

The wax particles rise through the descending stream of fresh solvent in the supplemental cleansing column 27, thereby more completely washing away traces of oil carried with the wax. This descending solvent containing a small percentage of oil, can be conveniently pumped through the pipe 16 leading from the bottom of column 27 to the upper portion of the column 12.

All of the incoming solvent could be admitted as a constant stream through the pipe 28, but in some cases an advantage is gained by introducing a portion of the solvent through the pipe 15. The incoming fresh solvent can be thus employed to very effectively cleanse the outgoing wax before said solvent enters into the stream of incoming oil. Another advantage appears in the convenient recovery of a small percentage of valuable oil which is carried by the solvent to the incoming supply of oil.

The outgoing wax product, while still in a cold condition can be subjected to a simple straining or filtering operation for the purpose of separating free liquid from the wax. For example, the wax slurry may be discharged through a pipe 30 leading to a strainer 31 where free solvent is separated from the wax product which passes out through a conductor 32 while the solvent may be pumped through a pipe 33 leading to the pipe 16.

The conditions as to temperature, velocity, etc., in the supplemental cleansing column 27 can be separately regulated to accurately control the degree of cleansing, thereby providing for any desired degree of purity in the wax, and at the same time avoiding undue escape of oil which in some cases is the most valuable product. Moreover, the refining operations accurately controlled in this manner tend to reduce the total manufacturing cost of the refined oil and wax.

The temperatures in the settling zones and cleansing zones may be approximately the same as the temperature at which the wax is precipitated in the original solution, but variations in the temperatures are permissible where they do not result in objectionable changes in the condition of the wax particles.

At these temperatures, the selected wax particles are precipitated in any suitable solution having the required properties, and thereafter subjected to any suitable cleansing solvent having an affinity for the solution greater than the affinity of the wax for said solution. When this process is employed to dewax oils having paraffinic and naphthenic constituents, the precipitating solvent will have an affinity for the oil greater than the affinity of the wax for the paraffinic oil constituents, so as to dissolve the paraffinic oil without dissolving the paraffinic wax.

We claim:

1. In the art of separating waxy materials, the process which comprises maintaining two settling zones immediately below and in free communication with a scrubbing zone, precipitating wax particles in a relatively heavy dewaxing solution, transmitting a mixture of the solution and wax particles into one of said settling zones, discharging dewaxed solution from the lower portion of the last mentioned settling zone, while causing the wax particles to rise from the top of said last mentioned settling zone and through said scrubbing zone, transmitting a descending stream of solvent through the mass of wax particles rising in said scrubbing zone to remove portions of the solution carried by the wax particles, diverting said descending stream of solvent from said last mentioned settling zone and transmitting said descending stream into the other settling zone, allowing wax particles carried by said descending stream to return through the top of said other settling zone, and discharging said descending stream from said other settling zone.

2. In the art of separating waxy materials, the process which comprises maintaining two settling zones immediately below and in free communication with a cleansing zone, one of said settling zones being surrounded by the other, precipitating wax particles in a relatively heavy dewaxing solution, transmitting a mixture of the solution and wax particles into the inner settling zone, discharging dewaxed solution from the lower portion of said inner settling zone, while causing the wax particles to rise from the top of said inner settling zone and through said cleansing zone, transmitting a descending stream of solvent through the mass of wax particles rising in said cleansing zone to remove portions of the solution carried by the wax particles, diverting said descending stream of solvent from said inner settling zone and transmitting said descending stream into the outer settling zone, allowing wax particles carried by said descending stream to return through the top of said outer settling zone, and discharging said descending stream from the lower portion of said outer settling zone to the waxy material at another stage of the process.

3. In the art of separating waxy materials, the process which comprises maintaining a settling zone in communication with a scrubbing zone having upwardly inclined baffles, precipitating wax particles in a relatively heavy dewaxing solution, allowing the mixture of solution and wax particles to settle in said settling zone, discharging dewaxed solution from the lower portion of said settling zone, while causing a stream of the wax particles to rise from the top of said settling zone and through said scrubbing zone, transmitting a descending stream of solvent through the mass of wax particles rising in said scrubbing zone to remove portions of the solution carried by the wax particles, forming layers of the rising wax particles contacting with the upwardly inclined baffles of said scrubbing zone, causing said layers of rising wax particles to intersect the paths of said descending solvent while flowing from one inclined plane to another, maintaining free paths for the rising and descending streams in said scrubbing zone, mechanically removing waxy material tending to accumulate on said upwardly inclined baffles, and separating the scrubbed wax particles from the descending stream of solvent.

4. In the art of dewaxing oils, the process which comprises maintaining a settling zone immediately below and in free communication with a counterflow extraction zone, while dewaxing the oil in said settling zone and deoiling the wax in said counterflow extraction zone, said process including the steps of dissolving the wax-bearing oil in a selective dewaxing solvent, cooling the solution to precipitate wax in said solution, transmitting a mixture of the cooled solution and wax particles into said settling zone, causing relatively heavy dewaxed solution to drop by gravity from the wax particles in said settling zone, discharging said dewaxed solution from a lower portion of said settling zone, while causing said wax particles to rise from the dewaxed solution in said settling zone, transmitting said wax particles into said counterflow extraction zone, while transmitting a descending stream of relatively heavy cleansing solvent through the mass of rising wax particles, thereby extracting oily material from the rising wax in said counterflow zone, diverting the descending stream of heavy cleansing solvent from the solution undergoing dewaxing in said settling zone, and transmitting the diverted solvent to said wax-bearing oil.

5. In the art of dewaxing oils, the process which comprises maintaining a settling zone in free communication with a counterflow extraction zone, while dewaxing the oil in said settling zone and deoiling the wax in said counterflow extraction zone, said process including the steps of precipitating wax particles in a relatively heavy dewaxing solution, transmitting a mixture of the liquid solution and wax particles into said settling zone, causing relatively heavy dewaxed solution to drop by gravity from the wax particles in said settling zone, discharging said dewaxed solution from a lower portion of said settling zone, while causing said wax particles to rise from the dewaxed solution in said settling zone, transmitting said wax particles into said counterflow extraction zone, causing the wax particles to rise in said counterflow extraction zone, while transmitting a descending stream of relatively heavy cleansing solvent through the mass of rising wax particles, thereby extracting oily solvent from the rising wax in said counterflow zone, so as to produce a descending stream of cleansing solution in said counterflow extraction zone, said counterflow extraction zone being in communication with the upper portion of said settling zone to receive the wax particles rising from the dewaxed solution, separating said descending stream of cleansing solution from said dewaxed solution at the settling zone, and separately discharging said stream of cleansing solution.

6. In the art of dewaxing oils, the process which comprises maintaining a settling zone in free communication with a counterflow extraction zone, while dewaxing the oil in said settling zone and deoiling the wax in said counterflow extraction zone, said process including the steps of precipitating wax particles in a relatively heavy dewaxing solution, transmitting a mixture of the liquid solution and wax particles into said settling zone, causing relatively heavy dewaxed solution to drop by gravity from the wax particles in said settling zone, discharging said dewaxed solution from a lower portion of said settling zone, while causing said wax particles to rise from the dewaxed solution in said settling zone, transmitting said wax particles into said counterflow extraction zone, causing the wax particles to rise in said counterflow extraction zone, while transmitting a descending stream of relatively heavy cleansing solvent through the mass of rising wax particles, thereby extracting oily solvent from the rising wax in said counterflow zone, so as to produce a descending stream of cleansing solution in said counterflow extraction zone, separating said descending stream of cleansing solution from said dewaxed solution at the settling zone, and separately discharging said descending stream of cleansing solution.

7. In the art of dewaxing oils, the process which comprises maintaining a settling zone in communication with a counterflow extraction zone, while dewaxing the oil in said settling zone and deoiling the wax in said counterflow extraction zone, said process including the steps of dissolving the wax-bearing oil in a selective dewaxing solvent, cooling the solution to precipitate wax in said solution, forcibly breaking the wax into minute particles in the cooled liquid solution, transmitting a mixture of the cooled liquid solution and minute wax particles into said settling zone, causing relatively heavy dewaxed solution to drop by gravity from the minute wax particles in said settling zone, discharging said dewaxed solution from a lower portion of said settling zone, while causing the minute wax particles to rise from the dewaxed solution in said settling zone, transmitting said minute wax particles into said counterflow extraction zone, while transmitting a descending stream of relatively heavy solvent through the rising mass of minute wax particles in said counterflow extraction zone, thereby extracting oily material from the rising wax in said counterflow zone, so as to produce a descending stream of cleansing solution in said counterflow extraction zone, separating said descending stream of cleansing solution from said dewaxed solution at the settling zone, and separately discharging said descending stream of cleansing solution.

8. In the art of dewaxing oils, the process which comprises maintaining a settling zone in free communication with a counterflow extraction zone, while dewaxing the oil in said settling zone and deoiling the wax in said counterflow extraction zone, said process including the steps of precipitating wax particles in a relatively heavy dewaxing solution, transmitting a mixture of the liquid solution and wax particles into said settling zone, causing relatively heavy dewaxed solution to drop by gravity from the wax particles in said settling zone, discharging said dewaxed solution from a lower portion of said settling zone, while causing said wax particles to rise from the dewaxed solution in said settling zone, transmitting said wax particles into said counterflow extraction zone, causing the wax particles to rise in said counterflow extraction zone, while transmitting a descending stream of relatively heavy cleansing solvent through the mass of rising wax particles, thereby extracting oily solvent from the rising wax in said counterflow zone, so as to produce a descending stream of cleansing solution in said counterflow extraction zone, said counterflow extraction zone being in communication with the upper portion of said settling zone to receive the wax particles rising from the dewaxed solution, separating said descending stream of cleansing solution from said dewaxed solution at the settling zone, separately discharging said stream of cleansing solution, and mixing said cleansing solution with the oil to be dewaxed, so as to form said dewaxing solution.

EDDIE M. DONS.
OSWALD G. MAURO.